United States Patent [19]

Pugh

[11] Patent Number: 4,613,096
[45] Date of Patent: Sep. 23, 1986

[54] HELICOPTER PROTECTOR

[75] Inventor: Billy G. Pugh, Corpus Christi, Tex.

[73] Assignee: Billy Pugh Co., Inc., Corpus Christi, Tex.

[21] Appl. No.: 582,909

[22] Filed: Feb. 23, 1984

[51] Int. Cl.[4] .............................................. B64D 47/00
[52] U.S. Cl. ................. 244/1 R; 244/17.11; 135/88
[58] Field of Search .................... 244/1 R, 17.11, 121; 150/52 R, 52 K; 135/88, 90

[56] References Cited

U.S. PATENT DOCUMENTS

| | | | |
|---|---|---|---|
| 2,279,812 | 4/1942 | Bartlett | 150/52 K |
| 2,508,757 | 5/1950 | Gray | 135/5 |
| 2,679,254 | 5/1954 | Green | 135/1 |
| 2,679,255 | 5/1954 | Stafford | 135/5 |
| 2,723,811 | 11/1955 | Blomquist | 244/1 R |
| 3,044,516 | 7/1962 | Stoll | 150/52 R |
| 3,133,715 | 5/1964 | Grunfelder | 244/17.11 |
| 3,815,650 | 6/1974 | Hickey | 150/52 R |
| 3,971,532 | 7/1976 | Fountain | 244/1 R |
| 4,008,730 | 2/1977 | Keklak et al. | 135/90 |
| 4,301,982 | 11/1981 | Tiemann | 244/17.11 |

OTHER PUBLICATIONS

"Global Chemical Systems Perfects Polyurethane Covers for Helicopters", *Vertiflite*, vol. 23, No. 3, May–Jun. 1977, p. 11.
"Aerospatiale's Twin Squirrel . . . ", *Flight International*, 13 Sep., 1980, photo on p. 1973.

*Primary Examiner*—Trygve M. Blix
*Assistant Examiner*—Rodney Corl
*Attorney, Agent, or Firm*—Stevens, Davis, Miller & Mosher

[57] ABSTRACT

A helicopter protector designed to protect the exterior of a helicopter from exposure to the elements and at the same time allow servicing of the helicopter. The protector utilizes the main rotor blade of the helicopter as a ridge-pole running forward and aft along an offset center line of the helicopter body; and includes main rotor support holders, main rotor tie-down means, a sheet of protective covering material and a plurality of tension binding straps.

6 Claims, 4 Drawing Figures

HELICOPTER PROTECTOR

BACKGROUND OF THE INVENTION

1. Field of the Invention

The present invention relates to the protection of a helicopter from exposure to the elements. More particularly, the present invention relates to a helicopter protector designed to protect the exterior of a helicopter from exposure to the elements, while at the same time allowing the helicopter to be serviced.

2. Description of the Prior Art

The problems associated with exposure of vehicles to the elements have been generally recognized for some time. Various arrangements for the protection of vehicles from exposure to the elements have been proposed as offering solutions to these problems. For example, arrangements for the protection of automobiles are described in U.S. Pat. Nos. 2,508,757; 2,679,254; and 2,679,255. Examples of prior art arrangements for the protection of aircraft are seen in U.S. Pat. Nos. 2,723,811; 3,044,516; and 3,815,650.

The arrangements described in the above-cited prior art references suffer from various drawbacks, such as being cumbersome and difficult to install or failing to provide both protection from the elements and access to the vehicle for servicing while the protective device is in place.

SUMMARY OF THE INVENTION

A principal object of the present invention is the provision of a helicopter protector capable of protecting a helicopter from exposure to the elements and at the same time allow servicing of the helicopter.

A further object of the present invention is the provision of a helicopter protector that is relatively simple to install.

An additional object of the present invention is the provision of a helicopter protector which is relatively light and compact when disassembled, thereby enabling the protector to be carried on board the helicopter so as to be available to protect the helicopter from exposure to the elements at remote landing sites.

The foregoing objects, as well as other general objects of the present invention, are achieved by the provision of a helicopter protector which utilizes the main rotor blade of the helicopter as a ridge-pole running forward and aft along an offset center line of the helicopter body; and which includes main rotor support holders to stabilize and support the main rotor, main rotor tie-down means to further stabilize the main rotor and in addition stabilize the main rotor support holders, a sheet of protective covering material which includes yard booms arranged substantially perpendicularly to the main rotor over the aft portion thereof and a cap portion adapted to fit over an end of the drive shaft of the main rotor and other parts associated with the main rotor drive system, and a plurality of tension-binding straps which hold the sheet of protective material in place over the helicopter body.

BRIEF DESCRIPTION OF THE DRAWINGS

A preferred embodiment of the present invention will now be described in greater detail, with reference being made to the accompanying drawings, in which.

DESCRIPTION OF THE PREFERRED EMBODIMENT

Figure 1:
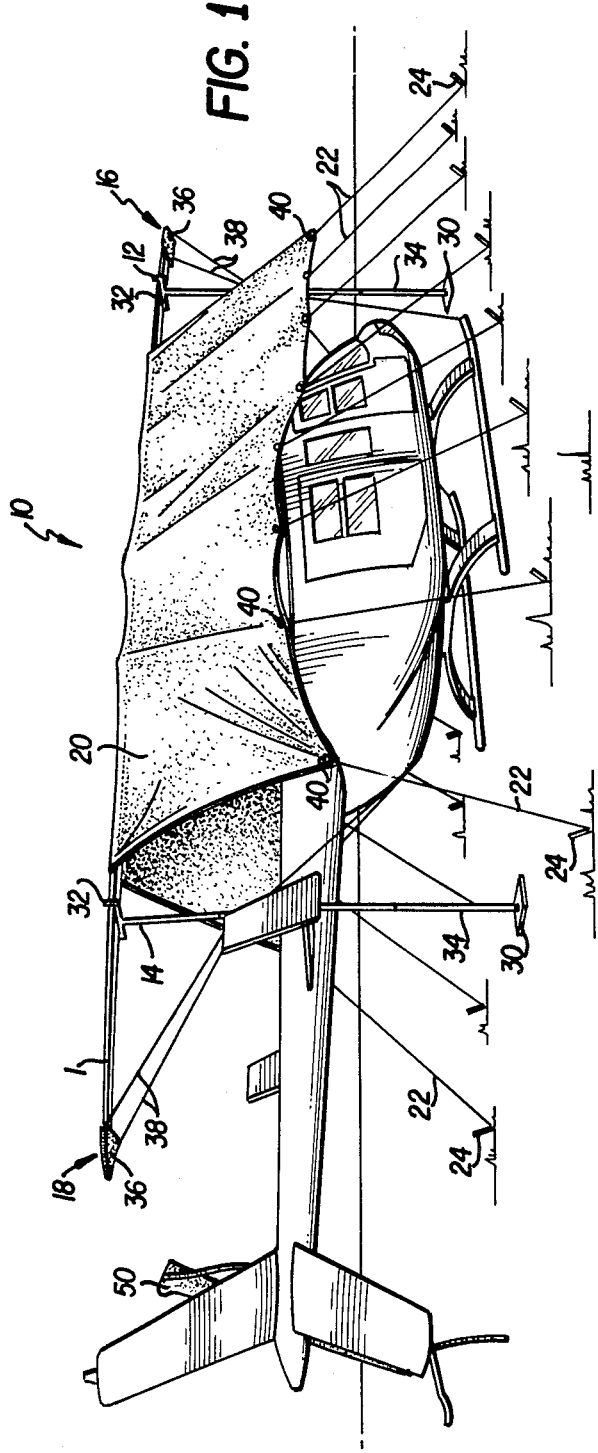
FIG. 1 is a perspective view of the assembled helicopter protector.
Figure 3:
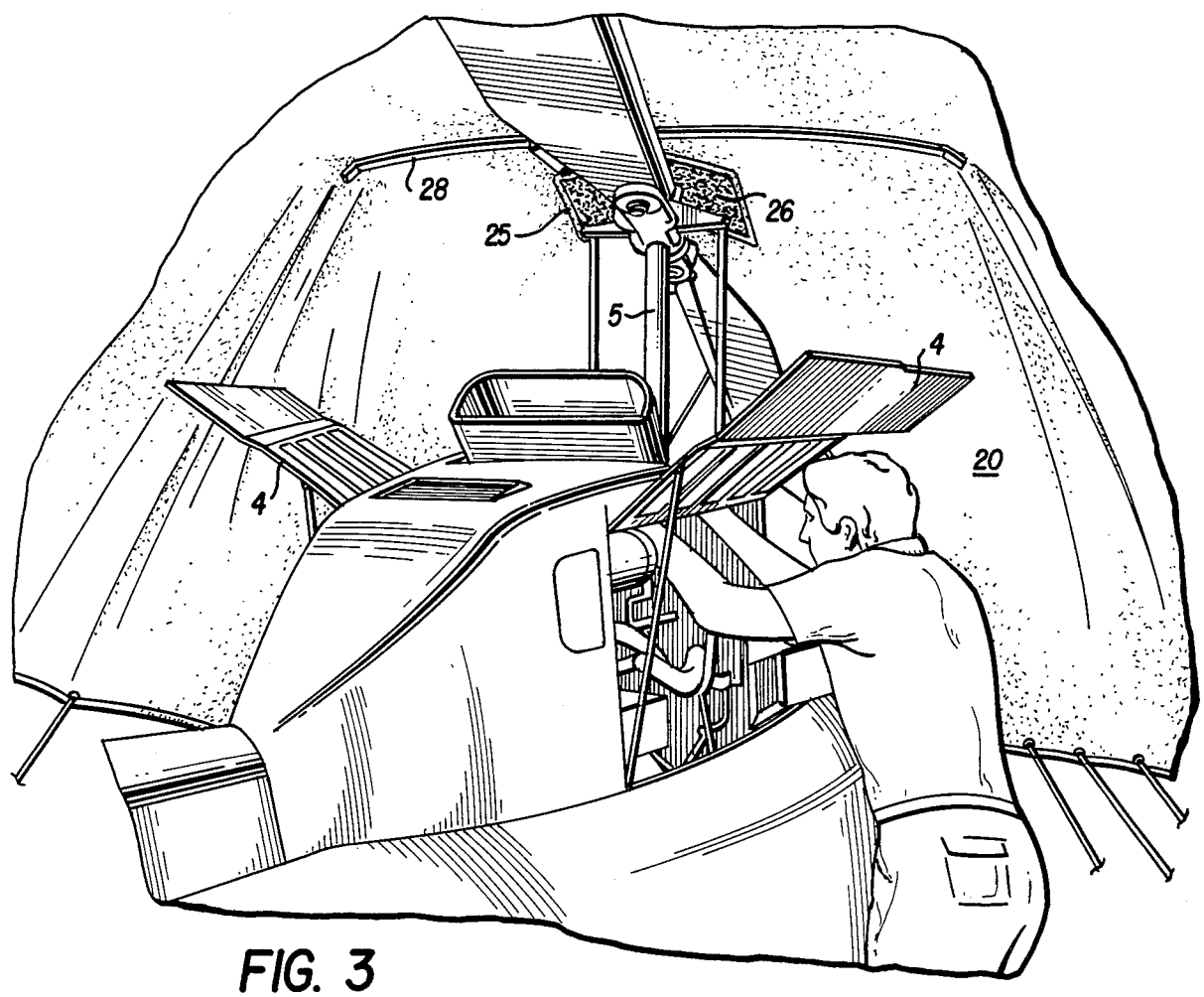
FIG. 3 is a perspective fragmentary view of the assembled helicopter protector showing the manner in which the protector allows access for maintenance, inspection and servicing of the engine bay of the helicopter.
Figure 4:
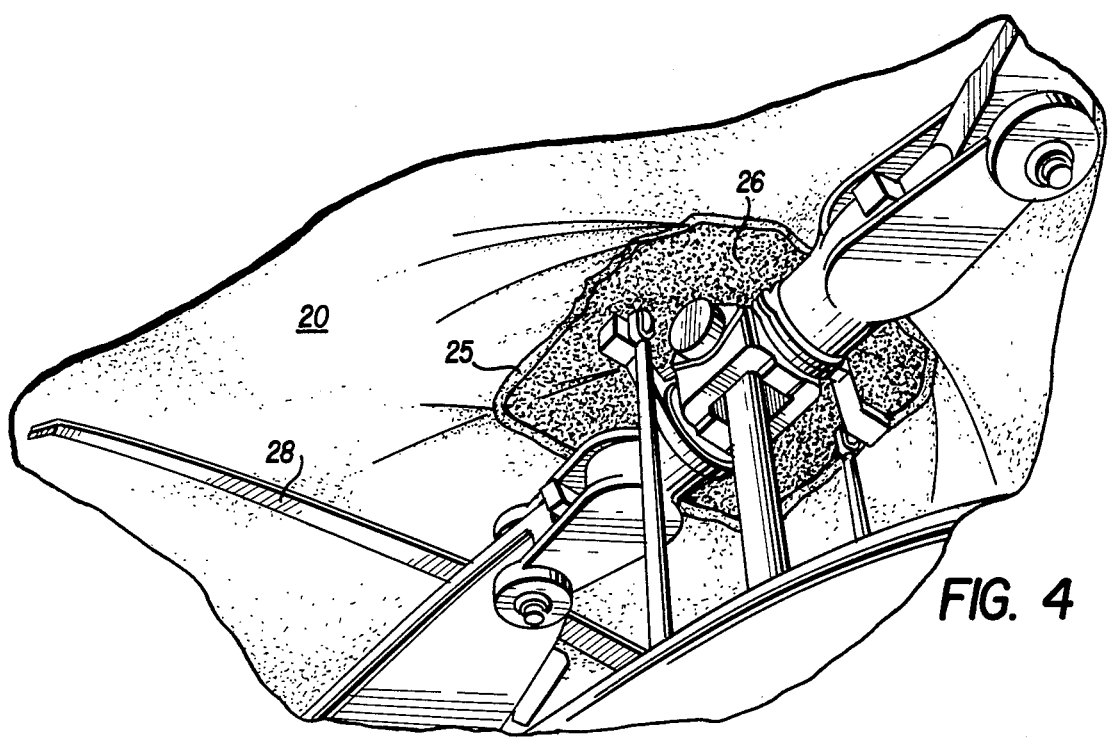
FIG. 4 is a perspective fragmentary view of the protective covering of the helicopter protector showing the location of the yard boom relative to the protective cap, and also showing the manner in which the protective cap fits over the drive shaft of the main rotor.

Referring first to FIG. 1, the helicopter protector 10 of the present invention includes forward 12 and aft 14 main rotor support holders, forward 16 and aft 18 main rotor tie-downs, a sheet of protective covering material 20, and a plurality of tension-binding straps 22 attached at one end to the protective covering and at the opposite end to ground stakes 24. As best illustrated in FIGS. 3 and 4, the protective covering includes a cap portion 26, a yard boom pocket 28, and a yard boom (not shown) present in the yard boom pocket.

The main rotor support holders 12,14 include a base portion 30 and a cradle portion 32, with telescoping hollow pole sections 34 extending between the cradle and base portions. The main rotor support holders are constructed of a lightweight material, preferably aluminum. The cradle 32 of the main rotor support holders is covered with a cushioning material, such as fabric covered foam, in order to prevent abrasion of the main rotor 1 of the helicopter.

The main rotor support holders provide a vertical lift to the main rotor, thereby stabilizing the main rotor and holding it in a fixed and positive location. The cradle portion 32 of the main rotor support holders also provides lateral stability to the main rotor of the helicopter.

Figure 2:
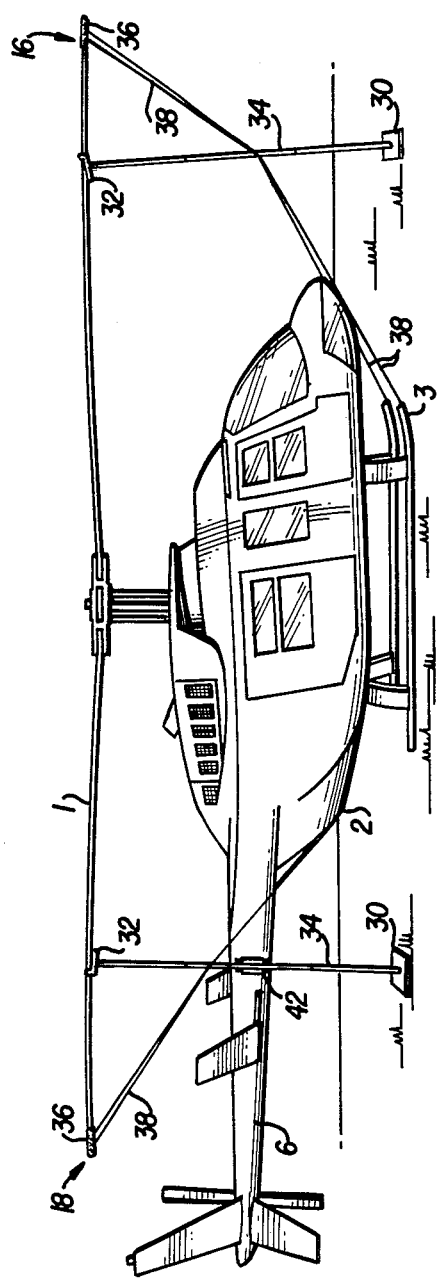
FIG. 2 is a side view of a helicopter having only the main rotor tie-downs and main rotor support holders of the protector in place.

The main rotor tie-downs 16,18 include a pocket portion 36 and at least two straps 38 having one end thereof attached to the pocket portion 36. The straps 38 are wrapped around the pole sections 34 of the main rotor support holders at least once. The ends of the straps 38 not attached to the pocket portion 36 of the main rotor tie-downs are secured to a stationary portion of the helicopter. In the embodiment of the present invention illustrated in FIG. 2, the straps 38 of the aft main rotor tie-down 18 are attached to an aft portion of the helicopter fuselage 2, while the straps 38 of the forward main rotor tie-down are attached to the skids 3 of the helicopter. Any suitable means may be utilized for attachment of the straps 38 to a stationary portion of the helicopter. For example, the ends of the straps 38 may be provided with hooks which are adapted for attachment to a loop or eyelet hook provided on the helicopter fuselage or skids.

The straps 38 must be flexible, and preferably are constructed of a high strength material, such as nylon. It is not necessary that the straps be elastic, however, elastic rubber straps may be utilized if desired. The straps 38 are preferably attached to the pocket portion 36 of the main rotor tie-downs by means of sewing, thereby eliminating the possibility that the main rotor may be scratched or marred by a metal eyelet provided in the pocket portions 36, or by a metal hook or similar device on the end of the straps 38 attached to the pocket portions. However, an eyelet and hook arrangement may be utilized for attachment of the straps 38 to the pocket portions 36, so long as care is taken to avoid the possibility that any metal objects utilized for the attachment may come into contact with the main rotor.

The straps 38 are preferably attached to the pocket portions 36 in a manner such that the straps extend at least partially over the upper side of the main rotor. This arrangement is preferred in order to obtain the desired amount of stabilization of the main rotor of the helicopter. The main rotor tie-downs 16,18 not only provide lateral and vertical stability to the main rotor of the helicopter, but also provide lateral stability to the main rotor support holders 12,14 by means of the wrapping of the straps 38 around the pole sections 34 of the main rotor support holders. Thus, the main rotor support holders cooperate with the main rotor tie-downs to stabilize the main rotor, thereby enabling the main rotor to function as a ridge-pole which supports the sheet of protective covering material 20.

The cap portion 26 of the sheet of protective covering material 20 is located in a central portion of the sheet, and is adapted to fit over the governors or other parts on top of the main rotor drive system in a manner such that no stress is placed on these parts when the sheet of protective covering material 20 is in place over the helicopter. The cap portion 26, shown in FIGS. 3 and 4, is formed by attaching a border of flexible, water impermeable material 25 to the perimeter of an opening cut into the sheet of protective covering material 20, with a layer of PVC foam then being attached to this border of material, thereby covering the opening in the sheet of protective covering material 20. The cap portion may be formed in any other suitable manner, so long as it is maintained substantially free of tension when the sheet of protective covering material 20 is spread over the body of the helicopter.

The yard boom pocket 28 is located on the underside of the sheet of protective covering material 20 at a point adjacent to the aft side of the cap portion 26. The yard boom pocket 28 is provided with an opening or other suitable means to allow the insertion of a yard boom (not shown) into the yard boom pocket. Once inserted, the yard boom extends and lifts the sheet of protective covering material 20 outwardly, thereby enabling the service doors 4 of the helicopter to be raised and allowing servicing of the helicopter while the protector 10 is in place. The yard boom comprises a rod of lightweight, rigid material such as aluminum. The rod is preferably hollow, and may be formed by two or more sections adapted to be joined together by means of a male-female fit. The protector 10 of the present invention must include at least one yard boom in order to extend the sheet of protective covering 20 and allow access to the engine bays of the helicopter. However, the protector 10 may include additional yard booms aft of the main rotor drive shaft 5 is desired, or if necessary to further extend the sheet of protective covering 20 so as to provide adequate space for access to the service bays of the helicopter.

The sheet of protective covering material 20 is provided with a plurality of reinforced eyelets 40 along the sides of the sheet opposite each end of the yard boom pocket. The tension binding straps 22 are provided with means on each end thereof to allow attachment to the eyelets 40 and the ground stakes 24. This means may comprise, for example, a hook suitable for insertion through the eyelets 40 and attachment around the ground stakes 24. The tension-binding straps are preferably rubber straps having a sufficient elasticity to maintain the sheet of protective covering material outwardly stretched over the body of the helicopter.

The helicopter protector of the present invention also preferably includes a chafing pad 42 strapped around the tail boom 6 of the helicopter. This chafing pad is positioned between the tail boom 6 and the pole sections 34 of the aft main rotor support holder 14, thereby preventing abrasion of the tail boom by the pole sections.

The helicopter protector of the present invention may be installed as follows. First, the main rotor support holders are placed under the main rotor in fore and aft positions. The adjustable pole sections of the main rotor support holders are then extended so as to lift the main rotor and place the blades of the main rotor in a non-stress position. The pocket portions of the main rotor tie-downs are then placed over respective ends of the main rotor, and the straps of each tie-down are wrapped around the pole sections of a respective main rotor support holder prior to being attached to a stationary portion of the helicopter. Having thus secured the main rotor in a fixed and positive location, the sheet of protective covering material, with the yard boom in place in the yard boom pocket, is placed over the main rotor. The protective cap is positioned over the main rotor drive system, thereby aligning the sheet of protective covering material over the main rotor. The tension binding straps are then attached to the eyelets at each corner of the sheet of protective covering material, and are stretched outwardly so as to be attached to respective ground stakes. Assembly of the helicopter protector is then completed by attaching the remaining tension-binding straps to the eyelets and ground stakes.

The foregoing description of a preferred embodiment of the present invention has been presented for purposes of illustration only, and should not be interpreted as limiting in any way the scope of the present invention as defined by the following claims. For example, the present invention also includes other embodiments which may be utilized to protect helicopters having more than one main rotor blade.

I claim:

1. A helicopter protector designed to protect the exterior of a helicopter from exposure to the elements and at the same time allow servicing of the helicopter, comprising:

main rotor support means, including two main rotor support holders; each of said main rotor support holders having a base portion, a cradle portion and adjustable pole sections extending between the base portion and the cradle portion;

main rotor tie-down means, including two main rotor tie-downs, each of said main rotor tie-downs having a pocket portion adapted to fit over an end of the main rotor and two flexible straps; each of said straps having a first end adapted for attachment to the pocket portion, a second end adapted for attachment to a stationary portion of the helicopter, and a flexible intermediate portion between said ends adapted to be wrapped around the adjustable pole sections of the main rotor support holders;

protective covering means, including a flexible sheet of water impermeable protective covering material and a yard boom; said sheet having a cap portion adapted to fit over the main rotor drive system of the helicopter located in a central portion thereof, an elongated pocket adapted to receive the yard boom attached to the sheet at a point near the cap portion, and a plurality of eyelets located along the periphery of the sheet on two sides of the sheet opposite each end of the yard boom; and securing means, including a plurality of ground stakes and tension-binding straps, each of said straps having a first end adapted for attachment to the eyelets of the sheet and a second end adapted for attachment to the ground stakes.

2. The helicopter protector of claim 1, wherein the adjustable pole sections of the main rotor support holders comprise a plurality of telescopic, hollow pole sections.

3. The helicopter protector of claim 2, wherein the plurality of telescopic, hollow pole sections comprises a first pole section adapted for attachment to the base portion, a second pole section slidably fitted within the first pole section, and a third pole section slidably fitted within the second pole section, said third pole section having the cradle portion attached thereto.

4. The helicopter protector of claim 1, wherein the flexible straps of the main rotor tie-downs comprise nylon straps having the first end thereof permanently attached to the pocket portion by means of sewing.

5. The helicopter protector of claim 1, wherein the cap portion of the sheet comprises a border of flexible, water impermeable material attached to the perimeter of an opening cut into the sheet and a layer of PVC foam attached to the border of material to cover the opening in the sheet.

6. The helicopter protector of claim 1, wherein the protective covering means further includes a second yard boom and a second elongated pocket adapted to receive said second yard boom.

* * * * *